United States Patent
Chen et al.

(10) Patent No.: US 12,267,761 B2
(45) Date of Patent: Apr. 1, 2025

(54) MANAGING EVENT NOTIFICATIONS

(71) Applicant: Comcast Cable Communications, LLC, Philadelphia, PA (US)

(72) Inventors: Michael Chen, Wallingford, PA (US); Jeff Ziembicki, Glenside, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/468,162

(22) Filed: Sep. 7, 2021

(65) Prior Publication Data
US 2023/0072905 A1 Mar. 9, 2023

(51) Int. Cl.
*H04W 4/90* (2018.01)
*G08B 25/01* (2006.01)
*G08B 27/00* (2006.01)
*H04W 4/38* (2018.01)

(52) U.S. Cl.
CPC ............ *H04W 4/90* (2018.02); *G08B 25/016* (2013.01); *G08B 27/005* (2013.01); *H04W 4/38* (2018.02)

(58) Field of Classification Search
CPC ........ H04W 4/38; H04W 4/80; G06T 19/003; G08B 27/005

USPC ....................................................... 455/404.1
See application file for complete search history.

(56) References Cited

U.S. PATENT DOCUMENTS

| | | | | |
|---|---|---|---|---|
| 2008/0007397 A1* | 1/2008 | Glazer | ............... | G08B 21/0269 340/539.11 |
| 2009/0133051 A1* | 5/2009 | Hildreth | ........... | H04N 21/42204 725/28 |
| 2014/0085077 A1* | 3/2014 | Luna | ..................... | A61B 5/0205 340/539.11 |
| 2015/0222977 A1 | 8/2015 | Angel, Jr. | | |
| 2016/0335801 A1* | 11/2016 | Yoon | .................... | G06F 3/04842 |
| 2017/0064412 A1* | 3/2017 | Taxier | .................... | H04L 67/12 |
| 2017/0073187 A1* | 3/2017 | Youker | .................... | G06F 3/041 |
| 2020/0128646 A1* | 4/2020 | Sinha | ..................... | H05B 1/028 |
| 2021/0110691 A1* | 4/2021 | Heinonen | ............ | G08B 29/188 |

* cited by examiner

*Primary Examiner* — Maria El-Zoobi
(74) *Attorney, Agent, or Firm* — Banner & Witcoff, Ltd.

(57) ABSTRACT

Systems, apparatuses, and methods are described for identifying and managing event notifications. An event notification manager may determine whether the received data corresponds to an occurring or a false event. The event notification manager may cause one or more user devices to output an event notification by at least partially interrupting output of other content.

23 Claims, 10 Drawing Sheets

MANAGING EVENT NOTIFICATIONS

BACKGROUND

Persons in a home or other type of environment may wish to be informed of events that may affect them or their environment. Information that potentially indicates an event may be received from a variety of sources. Determining whether to provide a notification based on such received information presents challenges.

SUMMARY

The following summary presents a simplified summary of certain features. The summary is not an extensive overview and is not intended to identify key or critical elements.

Systems, apparatuses, and methods are described for managing event notifications. Data indicating an event may be received from one or more sensors and/or from one or more other sources (e.g., news reports, emergency messages, etc.). The received data may be processed (e.g., by comparison to one or more event type criteria) to determine if some or all of the received data indicate occurrence of one or more events. The received data may also or alternatively be processed to determine if an event indicated by the received data is a false event (e.g., if the received data may have incorrectly indicated that event) and/or an event that may not be applicable to a particular premises or other environment. Notifications may be output for events determined to have occurred. For example, one or more user devices may be caused to output an audio, video, text, virtual reality (VR), augmented reality (AR), mixed reality (MR), and/or other type of notification associated with a determined event. Notifications may be caused and/or omitted based on user preferences and/or other configuration data. For example, and for a particular event, one or more devices may be caused to output a notification different from a notification output by one or more other devices, and/or one or more devices may not be caused to output a notification. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
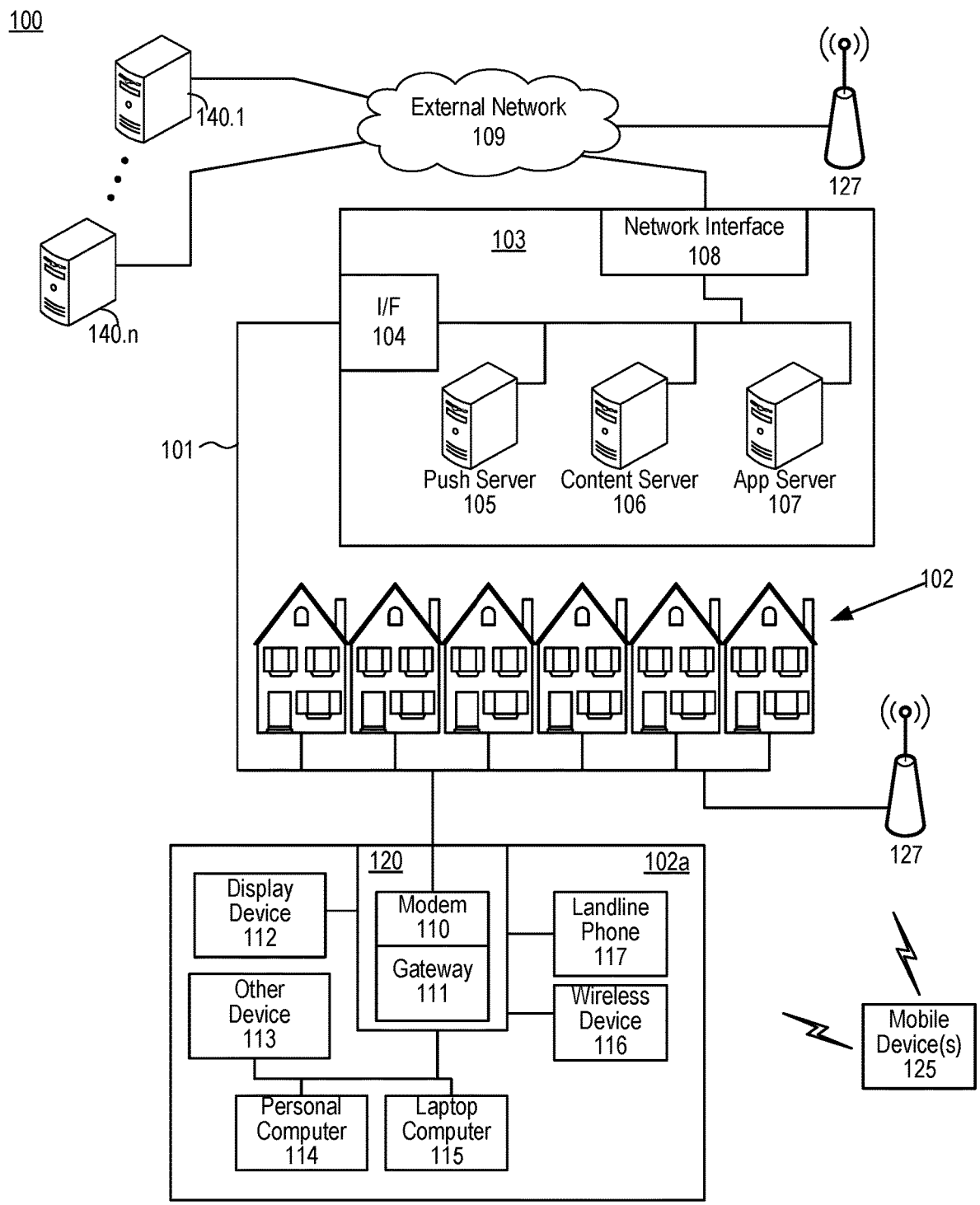
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104. The interface 104 may comprise one or more computing devices configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The interface 104 may, for example, comprise one or more routers, one or more base stations, one or more optical line terminals (OLTs), one or more termination systems (e.g., a modular cable modem termination system (M-CMTS) or an integrated cable modem termination system (I-CMTS)), one or more digital subscriber line access modules (DSLAMs), and/or any other computing device(s). The local office 103 may comprise one or more network interfaces 108 that comprise circuitry needed to communicate via the external networks 109. The external networks 109 may comprise networks of Internet devices, telephone networks, wireless networks, wired networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The local office 103 may comprise additional servers, such as additional push, content, and/or application servers, and/or other types of servers. Also or alternatively, one or more servers 140.1 through 140.n may be part of the external network 109 and may be configured to communicate (e.g., via the local office 103) with computing devices located in or otherwise associated with one or more premises 102. Although shown separately, the push server 105, the content server 106, the application server 107, the servers 140.1-140.n, and/or other server(s) may be combined. The servers 105, 106, 107, 140.1-140.n, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), other devices 113 (e.g., a DVR or STB), personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks may comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
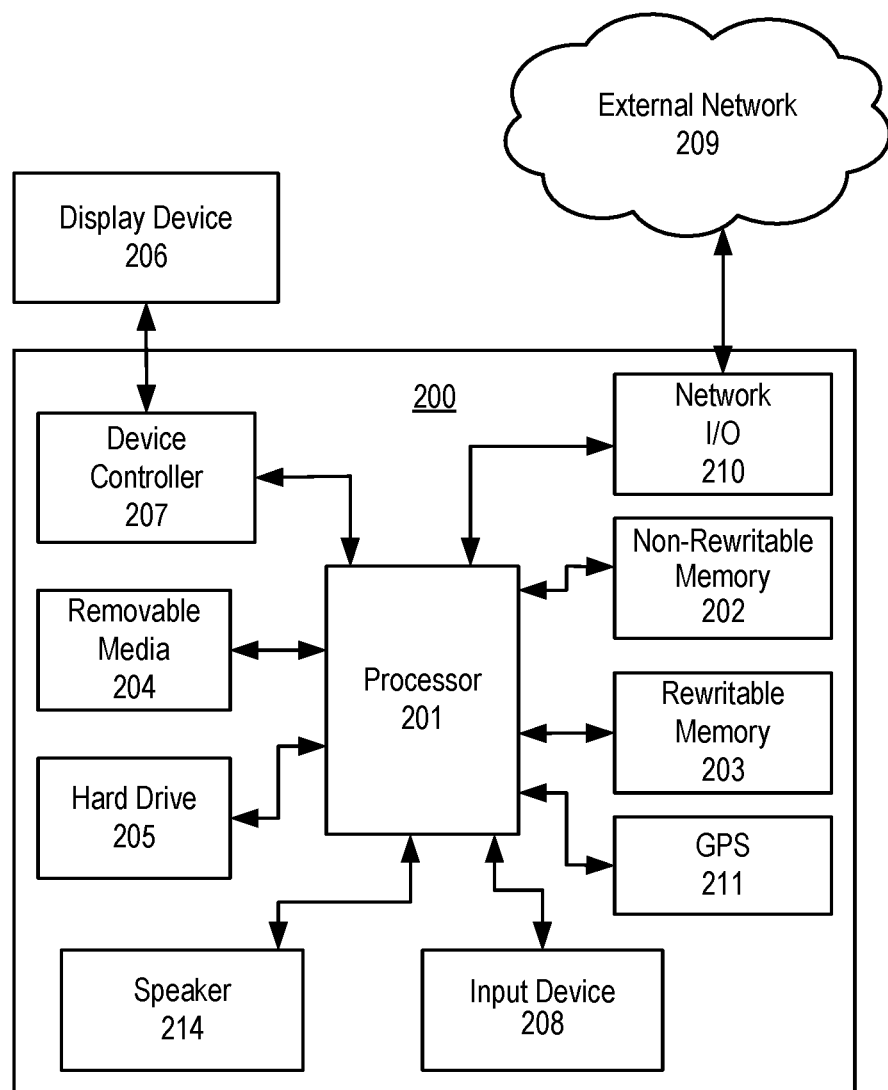
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109, any of the servers 140.1-140.n) and any other computing devices discussed herein (e.g., any of the sensors, user devices, and other computing devices described below and/or shown in any of the drawing figures). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable storage medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a game controller, a VR controller, a MR controller, an AR controller, a motion sensing camera, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200. The computing device may comprise sensor components that enable the computing device to receive one or more of the data types described below.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
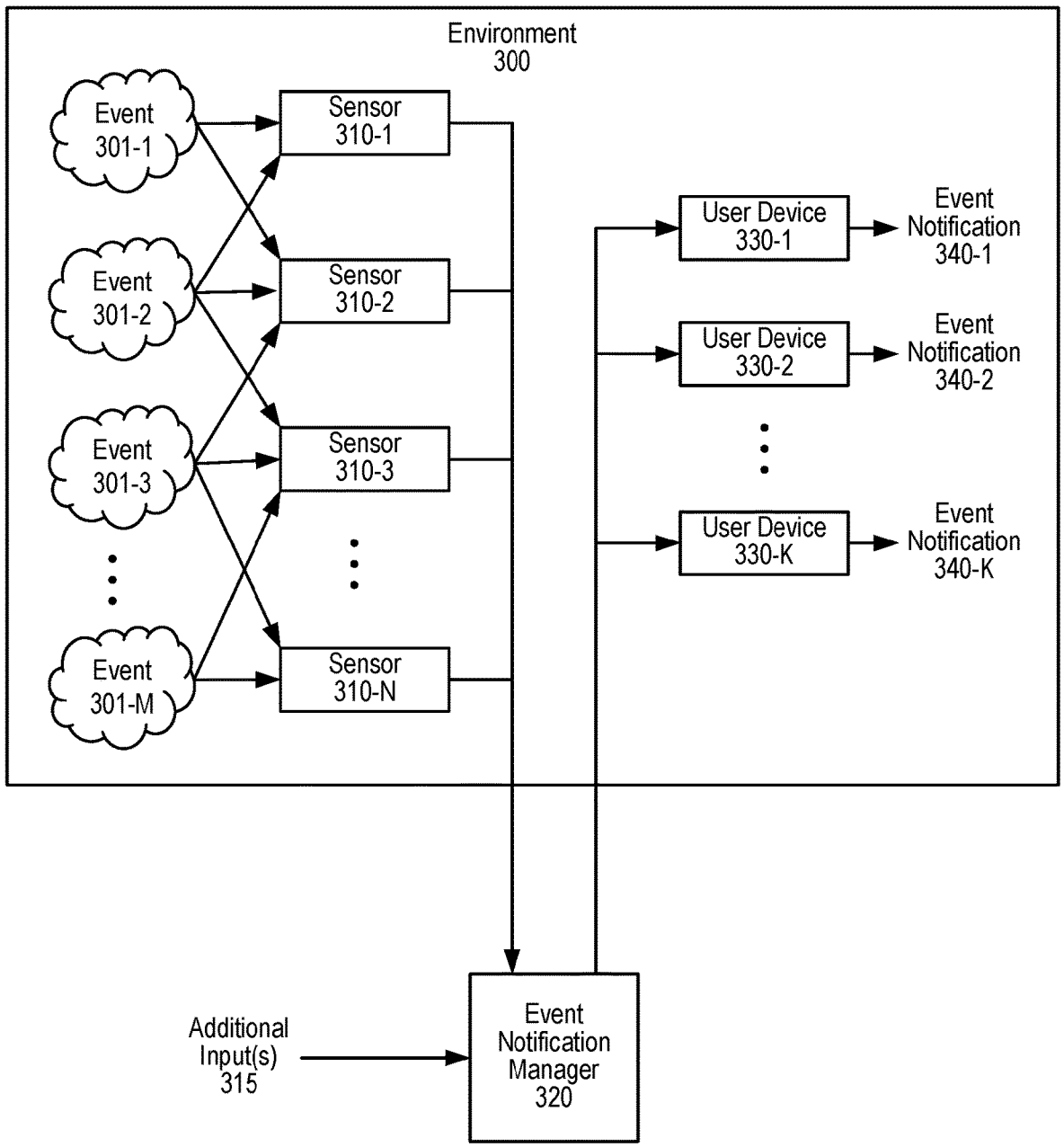
FIG. 3 shows an environment comprising events and event notifications.

FIG. 3 shows an example environment 300 that may comprise one or more spatial regions, wherein each spatial region may comprise one or more elements. The one or more spatial regions may correspond to any combination of arbitrarily shaped regions of space. For example, the one or more spatial regions may be associated with a one or more premises 102 (e.g., one or dwellings, offices and/or other building(s) and/or space(s) such as a yard, parking lot, street, and/or other spatial region that may be adjacent to or near the building(s)). The one or more spatial regions of the environment 300 may be contiguous or noncontiguous, may comprise one or more rooms in a building, one or more floors of a building, areas of land associated with a building, a neighborhood or portion thereof, one or more airspace regions (e.g., above one or more premises), one or more bodies of water or portions thereof, and/or other spatial regions. Elements within the environment 300 may correspond to one or more naturally occurring elements (e.g., terrain, bodies of water, atmosphere, terrestrial and/or extraterrestrial weather systems, various types of flora, vegetation, pathogens, human and other animal life forms, etc.) and/or one or more non-naturally occurring elements (e.g., computing devices, buildings, ground vehicles, aircraft, watercraft, spacecraft, any other human-made devices or structures, etc.). One or more elements may, alone or in combination with other elements, become associated with an event that may increase the risk of damage or harm to some or all of the other elements. For example, an event may be associated with an increased risk of life-threatening injury to people residing within the environment or a portion of the environment.

One or more of events 301-1, 301-2, . . . , 301-M (collectively, "events 301"; generically, "event 301") may occur within (or otherwise affect) the environment 300. An event 301 may comprise one or more naturally occurring phenomena (e.g., an earthquake, a landslide, a tsunami, volcanic activity, an avalanche, a flood, an extreme temperature, a drought, a wild-fire or other fire of natural origin, a cyclone, a storm, a tornado, a hurricane, a wave-surge, a disease outbreak/epidemic/pandemic, insect and/or animal activity, etc.). Also or alternatively, an event 301 may comprise one or more human-related phenomena (e.g., a ground vehicle and/or aircraft accident, a watercraft accident, a structure fire, an emergency-medical-service (EMS) activity, a mass casualty, a violent conflict, criminal activity (e.g., burglary, robbery, etc.), riot or other civil unrest, a mass evacuation, environmental pollution, a hazardous material (HAZMAT) incident, an industrial accident, a terrorist incident, etc.). An event may comprise a change in a condition and/or an expected change of condition, of the environment 300, that may be caused by or otherwise correspond to naturally occurring phenomena and/or to human-related phenomena.

The environment may comprise one or more sensors 310-1, 310-2, . . . , 310-N (collectively "sensors 310"). An event may cause a sensor 310 to output sensor data indicative of a condition (e.g., light, sound, vibration, heat, smoke, moisture, etc.) detectable by that sensor 310. The sensors 310 may be computing devices and may send and/or receive data via communication channels (e.g., via the external network 209). Each of the sensors 310 may send sensor data to an event notification manager 320 or other computing device. The sensor data may comprise one or more data types such as audio data, images, video, thermal data, temperature data, entry sensor data (e.g., data indicating a door, window, or other premises access point has been opened or closed), security sensor data (e.g., data indicating a security sensor has been tripped), seismic data and/or other ground vibration data, atmospheric pressure data, humidity data, wind speed and/or direction data, gas composition data, news report and/or weather report data, non-ionizing radiation data, ionizing radiation data, or any other type of information associated with a condition in the environment 300 and/or with an event. The sensors 310 may comprise one or more devices such as a video camera and/or a other video capture device, a microphone, a thermal camera, a vibration sensor, a thermometer, a resistance temperature detector (RTD), a Geiger counter, a thermocouple, a thermistor, a wind sensor, a water sensor, a light detection and ranging (LIDAR) sensor, a Doppler radar, a traffic enforcement camera, an antenna for receiving electromagnetic radiation, an ionizing radiation detector, a proximity sensor, an ultrasonic transducer, a pressure sensor, a photodetector, a photoelectric sensor, an accelerometer, a level sensor, a touch switch sensor, a gas detector, a smoke detector, an inclinometer, a chemical field-effect transistor, a carbon dioxide sensor, a carbon monoxide sensor, a hygrometer, a Hall-effect sensor, a gyroscope, an electro-optic sensor, a motion-detecting sensor, a catalytic bead sensor, meteorological and/or environment monitoring devices, or any other type of device configured to detect one or more conditions in the environment 300. One or more of the sensors 310 (and/or an alarm monitoring system, gateway, home automation device, and/or computing device via which the sensor(s) communicate with the event notification manager 320) may be configured to provide sensor data to the event notification manager 320 periodically and/or if a value of a sensed environmental characteristic satisfies a threshold.

The event notification manager 320 may comprise one or more computing devices (e.g., one or more of the servers 140.1 through 140.n, one or more of the servers in the local office 103, etc.). Although the event notification manager 320 is not in the environment 300 in the example of FIG. 3, the event notification manager could also or alternatively comprise a computing device located in the environment 300 (e.g., one of the computing devices shown in the premises 102a, and/or an alarm monitoring system and/or other computing device). The event notification manager 320 may send messages comprising instructions to any of the sensors 310. For example, the event notification manager 320 may send instructions to one of the sensors 310 requesting an alteration to one or more sensor characteristics (e.g., device orientation, lens focal point, power consumption, awake/hibernation cycles, signal processing parameters, sampling rate, reporting times, reporting thresholds, etc.). The instructions may also comprise software applications and software updates for installation on one or more of the sensors 310.

The event notification manager 320 may receive sensor data from the sensors 310 and subsequently determine if the sensor data corresponds to one or more of the events 301. For example, the event notification manager 320 may analyze wind speed and other atmospheric data collected from one or more of the sensors 310 and determine that a weather-related event (e.g., severe storm) is occurring. The event notification manager 320 may analyze audio data, images, and/or video collected from one or more of the sensors 310 and determine that one or more events associated with various combinations of sounds and/or images may be occurring (e.g., that sounds correspond to emergency services vehicle sirens, that light patterns correspond to emergency services vehicle flashing lights, that one or more sounds and/or one or more images correspond to the presence of an intruder, etc.). The event notification manager 320 may analyze data from smoke and/or temperature detectors and determine that a fire event is occurring.

Also or alternatively, the event notification manager 320 may receive (e.g., via one or more network connections) additional types of data indicating one or more types of events. The additional types of data, which are indicated generically in FIG. 3 as "additional input(s) 315," may comprise one or more of news reports, emergency bulletins from governmental authorities, Emergency Alert System (EAS) messages, and/or any other type of report or message indicating an event and/or possible event. A report, message, and/or other type of data received as an additional input 315 may indicate a type of event (e.g., a type of severe weather event, a fire, a vehicle accident, an industrial accident, a riot or other disturbance, a terrorist or other attack, criminal activity, and/or any other type of event) and/or other details about the event (e.g., areas affected, areas likely to be affected, danger level, recommended actions (e.g., evacuate, shelter-in-place, etc.), and/or other details).

As described in more detail below, the event notification manager 320 may, based on sensor data from one or more of the sensors 310 and/or additional input(s) 315, determine whether an event has occurred. The event notification manager 320 may, for determined events and/or based on user preferences and/or other configuration settings, cause one or more user devices 330-1 through 330-K (collectively, "user devices 330"; generically, "user device 330") to output one or more event notifications 340-1 through 340-K (collectively, "event notifications 340"; generically, "event notification 340"). The user devices 330 may comprise any of the devices described in connection with the premises 102a, a mobile device 125, a home automation system, a game console, and/or any other type of computing device. Although FIG. 3 shows an event notification 340 associated with each user device 330, one or more user devices 330 associated with the event notification manager 320 may not output an event notification.

One or more of the user devices 330 may output the event notifications 340 via (and/or may comprise) one or more types of output devices (e.g., display screen(s), speaker(s), VR headset(s), MR headset(s), AR headset(s), earphone(s), etc.) that output audio, video, text, and/or other types of information to one or more users. An event notification may, for example, comprise audio describing, imitating (e.g., simulating one or more sounds associated with), and/or otherwise indicating an event, video and/or still images describing, imitating (e.g., simulating one or more sights associated with), and/or otherwise indicating an event, text describing and/or otherwise indicating event, and/or other types of output. An event notification may also or alternatively include other types of information about an event (e.g., severity, expected duration, recommended action, sources for additional information, etc.).

FIGS. 4A-4E are a flowchart showing steps of an example method for managing event notifications. One, some, or all steps of the example method of FIGS. 4A-4E may be performed by the event notification manager 320, and for convenience FIGS. 4A-4E will be described below in connection with the event notification manager 320. Also or alternatively, one, some, or all steps of the example method of FIGS. 4A-4E may be performed by one or more other computing devices. One or more steps of the example method of FIGS. 4A-4E, and/or one or more communications described in connection with the example method of FIGS. 4A-4E, may be rearranged (e.g., performed, sent, or received in a different order), omitted, and/or otherwise modified, and/or other steps and/or communications added. A communication described in connection with the example method of FIGS. 4A-4E need not be a single message nor contained in a single packet, block, or other transmission unit.

In step 401, the event notification manager 320 may determine if one or more new data segments are available. A data segment may comprise sensor data from a sensor (e.g., one or more of the sensors 310). Also or alternatively, a data segment may comprise a report, message, and/or other data received as an additional input 315. Also or alternatively, a data segment may comprise information indicating geographic location(s) of one or more of the sensors 310 and/or of one or more conditions detected by the one or more sensors 301. Step 401 may comprise determining whether it is time to listen for new data segments (e.g., whether a time period since a previous check for new data segments has expired). Also or alternatively, step 401 may comprise checking one or more message queues to determine if sensor data has been received or if an additional input has been received. Also or alternatively, step 401 may comprise determining if there is some other indication of new sensor data and/or of a new additional input. If the event notification manager 320 determines in step 401 that no new data segments are available, step 401 may be repeated. If the event notification manager 320 determines in step 401 that new data segments are available, step 403 may be performed.

In step 403, the event notification manager 320 may receive new data segments (e.g., if step 401 comprised a determination of a time to listen for new data segments) and/or retrieve new data segments (e.g., if data segment(s) have been received and buffered in message queue(s), if step 401 comprised a determination that sensor data and/or additional input(s) should be requested, etc.). The new data segments may be stored as part of step 403. That storage may comprise assigning a time period for storage. Different types of data segments may be assigned different time periods. For example, a data segment from an additional input 315 indicating a severe weather event may be stored for a time period indicated in that additional input (e.g., a time period until an expiration of a storm warning issued by a weather service). Conversely, various types of sensor data may be stored for a shorter period of time and/or until other method steps are performed (e.g., step 434 described below).

In step 406, the event notification manager 320 may compare each of the stored data segments to criteria associated with one or more predefined event types. For each of those event types for which the associated criteria are met by a stored data segment (including any data segments that may remain stored after one or more previous iterations of the method), an event data record may be generated. The event data record may comprise, may comprise a link to, and/or may be otherwise associated with, each of the data segments that meet the criteria associated with the event type of the event data record. One or more of the stored data segments may be associated with multiple event data records.

For example, the stored data segments may comprise an additional input 315 indicating a severe thunderstorm, sensor data from microphone indicating a sound consistent with thunder, sensor data from a wind sensor indicating high winds, and sensor data from a camera indicating light flashes consistent with lighting. All of these data segments may be associated with an event data record for a thunderstorm event type. However, the sensor data from the microphone may also indicate a sound consistent with an explosion. Accordingly, that microphone sensor data may also be associated with an event data record for an explosion event type. Additional details of step 406 are described below in connection with FIG. 4D.

In step 409, the event notification manager 320 may determine if any event data records were generated in the most recent performance of step 406. If not (e.g., if none of the stored data segments met criteria associated with any event type), step 434 (FIG. 4B) may be performed. If one or more event data records were generated, step 413 may be performed.

In step 413, the event notification manager 320 may select, from the event data records generated in the most recent performance of step 406, an event record for further processing. In step 416, the event notification manager 320 may determine whether that currently-selected event data record corresponds to a false and/or inapplicable event. A false event may, for example, comprise an incorrect indication of an event occurrence. That incorrect indication may result from data that might be consistent with an occurrence of a particular type of event, but which is determined (e.g., based on other data) to not actually indicate (and/or to have a low probability of indicating) an occurrence of that type of event. An inapplicable event may comprise an actual event, but that actual event may be of reduced concern (e.g., a storm located a significant distance from the environment 300 and that is not moving toward the environment 300). Additional details of step 416 are described below in connection with FIG. 4E. If the event notification manager 320 determines in step 416 that the currently-selected event data record corresponds to a false and/or inapplicable event, step 443 (FIG. 4C) may be performed. If the event notification manager 320 determines in step 416 that the currently-selected event data record does not correspond to a false event and does not correspond to an inapplicable event, step 419 may be performed.

In step 419, the event notification manager 320 may select a user device from one or more user devices associated with the event notification manager 320. The event notification manager 320 may, for example, be associated with a group of one or more user devices (e.g., the user devices 330). The associated user devices may be associated with the event notification manager 320 based on one or more of: being located in a particular premises or other environment, being associated with a particular account for provision of data and/or other services, being associated with a specific user or group of users, being registered with the event notification manager as related devices, and/or other characteristics. The event notification manager may store and/or otherwise have access to data for each of the associated user devices. That data may comprise one or more of: device type, device output capabilities, associated user (e.g., minor or adult), notification preferences, user configuration settings, network address and/or other information for communicating with the user device, connection status (e.g., whether connected to a network), operation status (e.g., whether device is outputting content, content being output, etc.), geographic location (e.g., of a user device and/or of a premises), and/or other information. The event notification manager 320 may be associated with multiple groups of user devices (e.g., for each of multiple accounts, locations, etc.) and may separately perform the method of FIGS. 4A-4E (e.g., in separate programming threads) for each of those user device groups.

In step 420, the event notification manager 320 may determine whether the user device selected in the most recent performance of step 419 should be caused to output an event notification based on the current-selected event data record. Step 420 may comprise determining whether that user device is powered on, is connected to a network, and/or is otherwise in a state in which event notifications can be output. Step 420 may further comprise determining, based on notification preferences and/or user configuration settings, whether that currently-selected user device should be caused to output an event notification based on the current-selected event data record. For example, a user may have input configuration information indicating that notifications for one or more types of events are not desired for one or more user devices.

Also or alternatively, a user device (e.g., a user device associated with an adult, healthcare worker, parent, guardian, teacher, and/or other authority figure) may be configured to receive event notifications sent to one or more other user devices (e.g., user devices associated with family, children, friends, students, minors, healthcare patients, dependent(s), etc.). One or more of the other user devices may set notification preferences indicating what information may be shared with the user device (e.g., some types of event notifications may be shared but not others, a user device location may be shared or not shared, some portions of monitored health status may be shared and other portions not shared). Moreover, the user device may receive information of the one or more other user devices based on the notification preferences. For example, a user may configure notification preferences so that received event notification and monitored health status information are sent to user devices of family members and/or friends indicated by the notification preferences.

If the event notification manager 320 determines in step 420 that the currently-selected user device should not be caused to output an event notification for the currently-selection event data record, step 428 (described below) may be performed. If the event notification manager 320 determines in step 420 that the currently-selected user device should be caused to output an event notification for the currently-selection event data record, step 422 may be performed.

In step 422, the event notification manager 320 may determine what type of notification to output. For example, the event notification manager 320 may determine, for the device type of the currently selected user device, the event notification type that may be output by the user device (e.g., text only, image and/or video only, audio only, a combination of audio, image, video, and/or text, VR, MR, AR, etc.). Also or alternatively, the event notification manager 320 may determine, based on notification preferences and/or other user information, the event notification type (e.g., text messages, warning sounds/imagery/video, types of event details and/or information to output such as indications of imminent hazards, text only, image and/or video only, audio only, a combination of audio, image, video, and/or text, etc.). For example, the event notification manager 320 may determine, based on the notification preferences and/or other user information, to output detailed notifications (e.g., imagery/video of a nearby traumatic event) for some user devices (e.g., used by adults), and/or less detailed notifications (e.g., a text and/or audio message to find the nearest parent, teacher and/or other trusted adult) for other user devices (e.g., used by minors).

Step 422 may comprise generating, based on a template (e.g., mathematical and/or physical predictive models, stock images and/or video and/or audio from libraries associated with different event types) corresponding to the event type, one or more of images, video, audio, or text data associated with the event. For example, for a fire event type, imagery and/or video (e.g., graphical displays of smoke and/or high temperatures in a premises and/or an outside location, indications of predicted spread or dissipation of the smoke and/or high temperatures) may be generated based on inputting sensed thermal data segments into fire predictive models (e.g., fire simulation tools). As another example for a storm event type, imagery and/or video (e.g., graphical displays for a local occurrence and predicted future occurrence of weather-related phenomena such as precipitation, lightning, tornadoes, hurricanes, and/or other storm events) may be generated based on inputting sensed meteorological data segments into weather predictive models (e.g., weather simulation tools, the Lorenz weather model, etc.). As yet another example for an intruder event type, imagery and/or video (e.g., graphical displays of a premises indicating current location(s) of one or more intruders and predicted trajectories and/or future locations for the one or more intruders) may be generated based on inputting data segments (e.g., video data from video cameras, audio data from microphones, and/or other types of data output by sensors of a home security system) into predictive models (e.g., equations for predicting future locations based on current location and velocity).

In step 425, the event notification manager 320 may cause the currently-selected user device to output an event notification of the type determined in step 422. Step 425 may comprise sending, via a network, data to the user device that causes the user device to output audio, images, video, and/or text associated with the determined type event notification. The data sent to the user device may comprise event notification content (e.g., audio, images, video, and/or text to be output) and/or instructions to the user device to output that event notification content. The instructions may cause the user device to output the event notification for a specified amount of time (and/or until an expiration time), or may instruct the user device to output the event notification until instructed (e.g., by the event notification manager 320 and/or by a user) to stop.

The event notification may at least partially interrupt output of other content by the user device. If, for example, the user device comprises a display screen being used to output video, images, and/or text for that other content, image(s), video and/or text of the event notification may be superimposed over a portion of that other content output. If, for example, the user device comprises a speaker or other sound output device being used to output audio for that other content, sound of the event notification may be superimposed over a portion of that other content sound. If, for example, the user device comprises a VR output device being used to output that other content, one or more virtual objects may be created and inserted, into the VR output of that other content, to superimpose images, video, text, and/or audio of the event notification.

In step 428, the event notification manager 320 may determine if there are other user devices, associated with the event notification manager 320, to be evaluated for possible event notification based on the currently-selected event data record. If yes, step 419 may be repeated. If no, step 431 may be performed. In step 431, the event notification manager 320 may determine if there are other event data records, generated in the most recent performance of step 406, remaining to be processed. If yes, step 413 may be repeated. If no, step 434 may be performed.

In step 434 (FIG. 4B), the event notification manager 320 may clean up data segments stored during the most recent performance of step 403, and/or during one or more previous performances of step 403. As indicated above, different types of data segments may be stored for different durations. Step 434 may comprise comparing a storage timestamp of the data segment to a current time and determining if a storage duration has been exceeded. If so, the data segment may be deleted. Some types of data segments may be flagged as storable for a specified quantity (e.g., 1 or more) of iterations of the method of one or more parts of the method of FIGS. 4A-4E. For such a data segment, the event notification manager 320 may determine how many times step 434 has previously been performed for that data segment and may delete the data segment if that quantity of times equals or exceeds the specified quantity of iterations.

In step 437, the event notification manager 320 may determine if any active event notifications (e.g., caused by one or more performances of step 425) have been output for a specified amount of time and/or have reached an expiration time. For any such event notifications, the event notification manager 320 may cause (e.g., by sending one or more messages) the corresponding user device(s) to cease outputting those event notifications. In step 441, which may be similar to step 401, the event notification manager 320 may determine if one or more new data segments are available. If no, step 434 may be repeated. If yes, step 403 (FIG. 4A) may be repeated.

As indicated above, the event notification manager 320 may in step 416 determine whether a currently-selected event data record corresponds to a false and/or inapplicable event. If yes, step 443 (FIG. 4C) may be performed. In step 443, similar to step 419, the event notification manager 320 may select a user device from the one or more user devices associated with the event notification manager 320. In step 446, the event notification manager 320 may determine (e.g., based on one or more notification preferences and/or configuration settings) if that user device should be caused to output a notification of a false and/or inapplicable event of the type associated with the currently-selected event data record. A user may, for example, wish be informed of a storm that is far away, that noises outside a premises do not correspond to an emergency, and/or otherwise wish to receive a notification of a false and/or inapplicable event. If the user device should not be caused to output a notification, step 453 may be performed. If the user device should be caused to output a notification, the event notification manager 320 may in step 449 send one or more messages to cause such output. In step 453, the event notification manager 320 may determine if there are additional user devices to be evaluated for possible notification of a false and/or inapplicable event. If yes, step 443 may be repeated. If no, step 431 (FIG. 4A) may be performed.

Figure 4A:
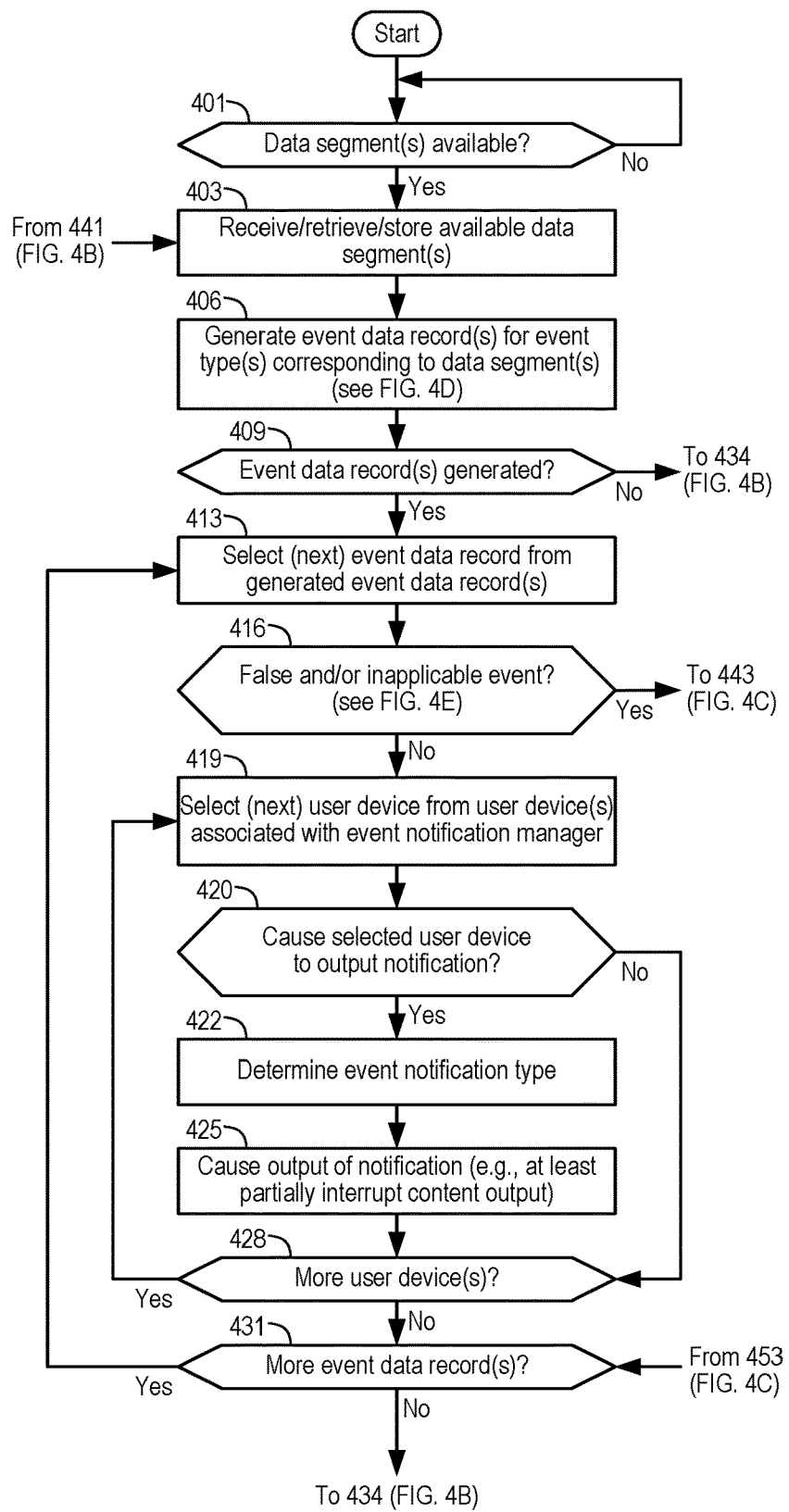
FIGS. 4A, 4B, 4C, 4D, and 4E are a flowchart showing an example method for managing event notifications.
Figure 4B:
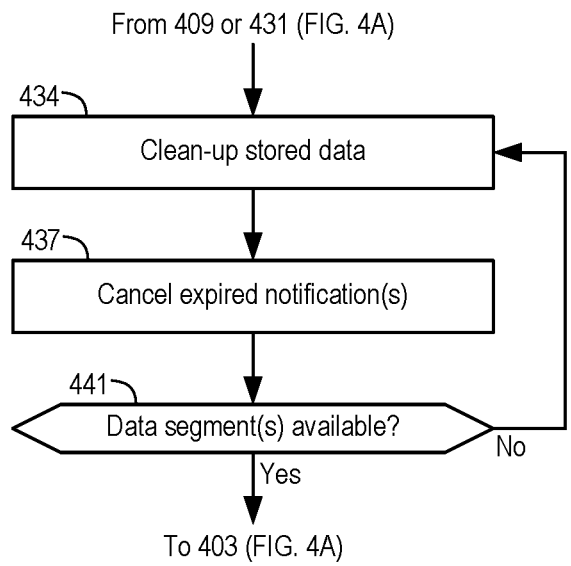
Figure 4C:
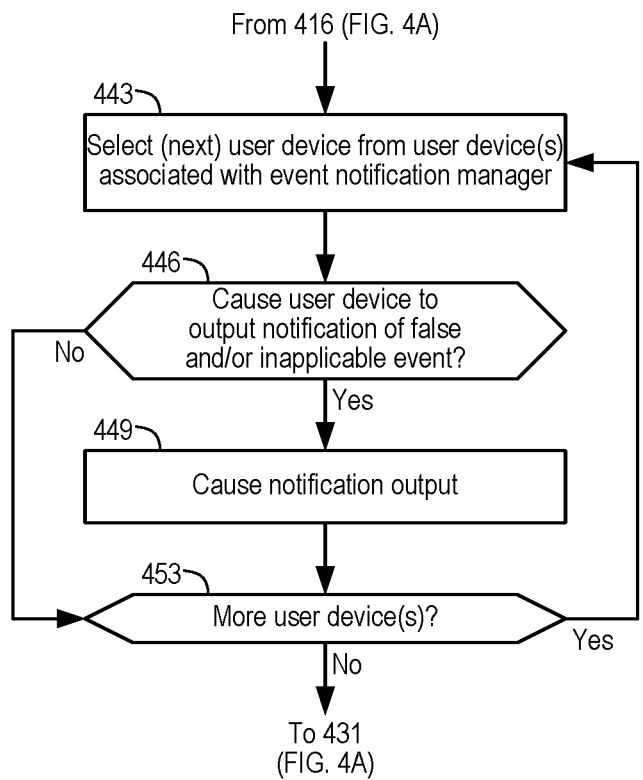
Figure 4D:
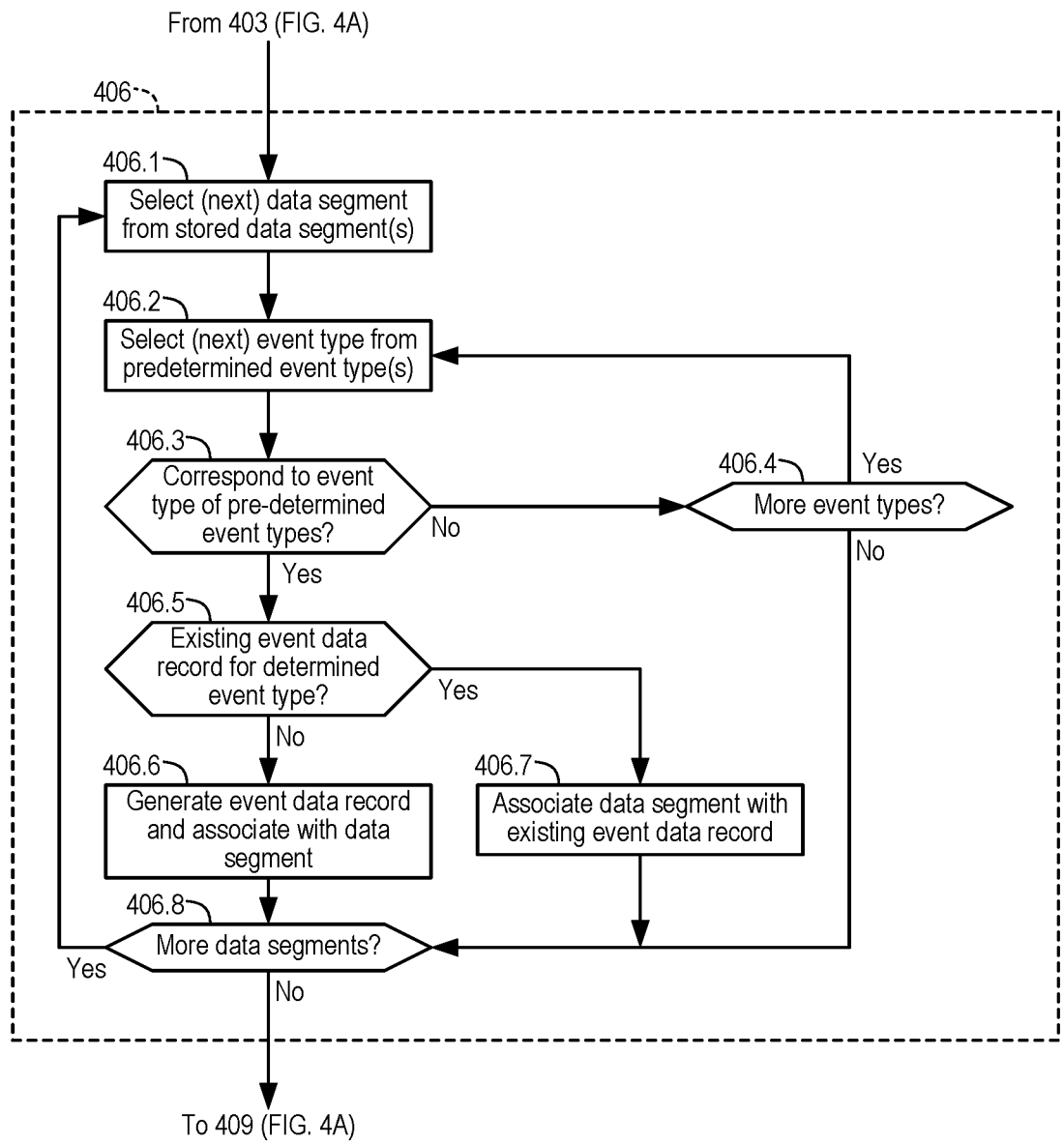

FIG. 4D shows, as indicated by a broken line box, additional details of step 406 from FIG. 4A. In particular, FIG. 4D shows example steps 406.1-406.8 that may be performed to generate event data records for event types corresponding to the data segments stored in step 403.

The event notification manager 320 may store and/or access (e.g., in a database) data defining a plurality of predefined event types. Examples of event types may include, without limitation, one or more of the following: severe thunderstorm, tornado, hurricane, tsunami alert, flood, building fire, wildfire/forest fire, earthquake, riot, terrorist activity, chemical/industrial hazard, criminal activity, building intrusion, unspecified local emergency, and/or any other type of event. An event type may also be defined for sensor data that is not readily characterizable as associated with a particular type of event, but which is of a character (e.g., high values for noise, light, etc.) that indicates unusual activity for which notifications may be appropriate.

For each event type, the event notification manager 320 may store one or more criteria for sensor data and/or for other data (e.g., additional information 315) that, if met, indicate an event of that type may be occurring. For example, various types of events may be associated with sounds having one or more intensity, frequency, duration, and/or other characteristics. A data segment comprising sound data may be compared to the sound characteristic criteria for a predefined event type to determine if that data segment corresponds to that event type. The sound criteria for event types may be similar (e.g., building fire, criminal activity, unspecified local emergency, and/or other event types may be associated with sound criteria indicating emergency vehicle sirens) or may be different.

As another example, various types of events may be associated with video and/or images having one or more spectral, intensity, duration, and/or other characteristics. A data segment comprising video and/or image data may be compared to the video/image characteristic criteria for a predefined event type to determine if that data segment corresponds to that event type. The video/image criteria for event types may be similar (e.g., building fire, criminal activity, unspecified local emergency, and/or other event types may be associated with video/image criteria indicating emergency vehicle lights) or may be different. As another example, various types of events may be associated with patterns detectable (e.g., using one or more pattern detection algorithms) detectable in video and/or images. A data segment comprising video and/or image data may be compared to the pattern recognition criteria for a predefined event type to determine if that data segment corresponds to that data type.

Criteria for various types of sensor data may be stored for other predefined event types. Further examples include, without limitation: wind speed criteria for severe thunderstorm, tornado, and/or hurricane events; water level criteria for a flood event; temperature, carbon monoxide, and/or smoke criteria for building fire or wildfire/forest fire events; vibration criteria for an earthquake event; door and/or window sensor criteria for an intrusion event; etc.

As described above, a data segment (e.g., received as an additional input 315) may comprise a news report, an EAS message, a communication from a governmental authority, and/or other type of report from an outside authority comprising text and/or metadata indicating the event type and/or providing other information about the event. For each of some or all predefined event types, the criteria may comprise one or more words and/or data flags. A data segment comprising a report from an outside authority may be compared against that criteria (e.g., by parsing text for one or more words and/or checking for one or more data flags) to determine if that data segment corresponds to an event type.

In step 406.1, the event data manager 320 may select a data segment from the data segments stored in step 403. In step 406.2, the event data manager 320 may select an event type from the predefined event types. In step 406.3, the event data manager 320 may determine if the currently-selected data segment corresponds to the currently selected event type. As part of step 406.3, a data type of the currently-selected data segment may be evaluated to determine if comparison to some or all criteria of the currently-selected event type is appropriate. For example, it may not be appropriate to compare data from a camera sensor to sound criteria, may not be appropriate to compare data from news report to smoke detector criteria, etc. Data types for the data segments may, for example, be stored with the data segments as part of step 403.

If a data type of the currently-selected data segment corresponds to a data type of the currently-selected event type, the currently-selected data segment and event type criteria may be compared. The comparison may comprise signal processing (e.g., one or more of a Fourier-transform, a z-transform, a Hilbert transform, analog and/or digital filtering, and any other linear and non-linear signal processing methods) and/or other analysis of some or all of that data segment prior to, and/or as part of, comparison to criteria of the currently-selected event type. Based on the comparison, the event notification manager 320 may determine whether the currently-selected data segment corresponds to the currently-selected event type. If no, step 406.4 may be performed. In step 406.4, the event notification manager 320 may determine whether there are additional predefined event types that should be evaluated for correspondence to the currently-selected data segment. If yes, step 406.2 may be repeated. If no, step 406.8 (described below) may be performed.

If the event notification manager 320 determines in step 406.3 that the currently-selected data segment corresponds to the currently-selected event type, step 406.5 may be performed. In step 406.5, the event notification manager 320 may determine if there is an existing event data record for the currently-selected event type (e.g., an event data record generated during a previous iteration of one or more steps shown in FIG. 4D). If no, an event data record may be generated in step 406.6 and the currently-selected data segment associated with that event data record. If yes, the currently-selected data segment may be associated with the existing event data record in step 406.7. After step 406.6 or step 406.7, the event notification manager 320 may in step 406.8 determine if there are more data segments to be evaluated for correspondence to the predetermined event types. If yes, step 406.1 may be repeated. If not, step 409 (FIG. 4A) may be performed.

Figure 4E:
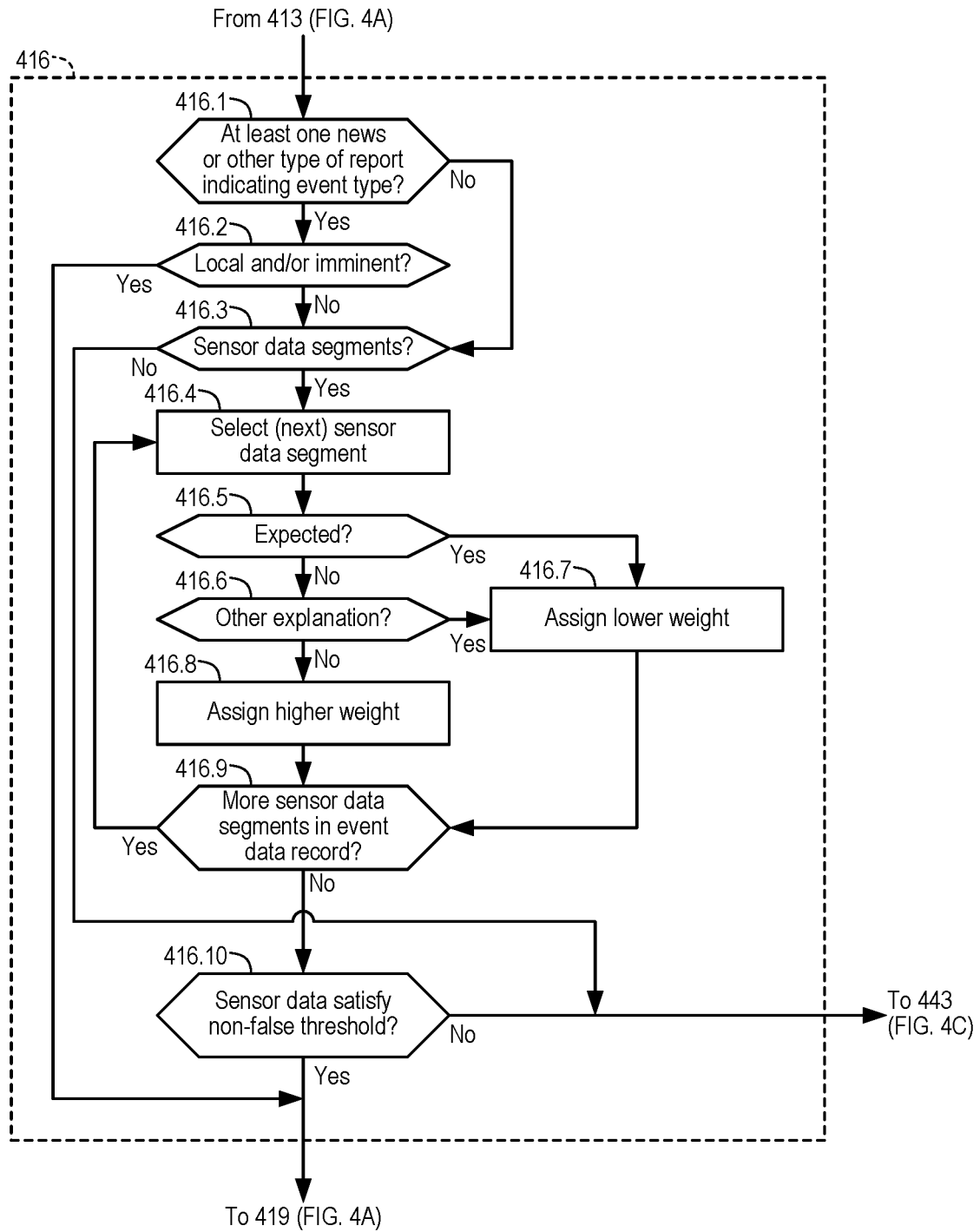

FIG. 4E shows, as indicated by a broken line box, additional details of step 416 from FIG. 4A. In particular, FIG. 4E shows example steps 416.1-416.10 that may be performed to determine whether an event data record corresponds to a false and/or inapplicable event.

In step 416.1, the event notification manager 320 may determine whether the currently-selected event data record comprises a news report, or other type of report or message, that specifically indicates a particular type of event and/or that specifically indicates occurrences associated with a particular event type. If no, step 416.3 (described below) may be performed. If yes, event notification manager 320 may in step 416.2 determine if the report/message indicates that the event is local to (e.g., within a predetermined proximity of) one or more of the user devices associated with the event notification manager 320, and/or immediate or imminent (e.g., whether the report/message indicates the event is already occurring, or will within a predetermined time period occur) in a region that is local to one or more of those user devices. If yes, step 419 (FIG. 4A) may be performed. If no, step 416.3 may be performed.

In step 416.3 the event notification manager 320 may determine if there are any sensor data segments associated with the currently-selected event data record. If no, step 443 (FIG. 4C) may be performed. If yes, the event notification manager 320 may in step 416.4 select a sensor data segment from those associated sensor data segments. In step 416.5, the event notification manager 320 may determine if the selected sensor data segment indicates an environmental condition that, although indicative of an event of the type corresponding to the currently-selected event data record, may be expected and/or otherwise not likely to be the result of such an event. For example, it may be expected that, at certain times of day, persons may use a door associated with a door sensor and/or move about in a portion of an environment associated with one or more motion sensors. If sensor data from those door or motion sensors indicates activity during a time when such activity is expected, that sensor data may be less likely to be associated with unwanted events.

Furthermore, the determination of whether the indicated environmental condition is expected may be based on determining a reliability associated with the selected sensor data segment. The reliability may be determined based on environmental conditions and on sensor 310 configuration data and/or other sensor 310 information (e.g., manufacturer data, bench testing measurements) associated with the selected sensor data segment. For example, the selected sensor data segment may have been received from a sensor 310 with a known tendency to falsely trigger when in the presence of a low voltage brownout. Thus, sensor data segments received from the sensor 310 during a low voltage brownout may be determined to be less reliable compared with sensor data segments received during typical power network conditions. Unreliable sensor data segments (e.g., data segments with a reliability below a pre-determined threshold) may be ignored and/or determined to indicate expected environmental conditions.

Also or alternatively, the determination of whether the indicated environmental condition is expected may be based on determining a level of trust associated with the selected sensor data segment. Determining the level of trust may comprise determining security information of a sensor 310 associated with the selected sensor data segment. For example, a low level of trust may be associated with sensor data segments received from a sensor known to be vulnerable to security compromise and/or received via unencrypted communication channels that are vulnerable to tampering. However, a high level of trust may be associated with sensor data segments received from a sensor configured with anti-tamper and/or cryptographically verifiable security. Untrustworthy sensor data segments (e.g., data segments with a level of trust value below a pre-determined threshold) may be ignored and/or determined to indicate expected environmental conditions. Also or alternatively, a determination of whether the selected sensor segment indicates an expected environmental condition may be based on the level of trust of the selected sensor data segment or a combination of the level of trust and other characteristics such as reliability. If the sensor data segment is determined in step 416.5 to be expected, step 416.7 (described below) may be performed. Otherwise, step 416.6 may be performed.

In step 416.6, the event notification manager 320 may determine if, for the currently-selected data segment, there is an explanation other than an event of the type associated with the currently-selected event data record. For example, if the event data segment indicates sounds and/or lights indicative of emergency vehicles, the event notification manager 320 may determine if any of the associated user devices are outputting content (e.g., a movie) in which an emergency vehicle is being depicted. Various other types of false alarm criteria may be used and applied to different types of data segments. For example, vibration sensor data may be consistent with an attempt to break a door, but may also be consistent with an earthquake or nearby heavy construction. If other vibration sensor data from other doors provides similar indications at about the same time, an earthquake or construction activity may be a more likely cause of the currently-selected sensor data. As another example, a loud noise detected by a microphone may be consistent with an explosion. However, if there are other data segments (e.g., a news report associated with a different event data record) strongly suggesting a thunderstorm, thunder may be a more likely cause of the currently-selected sensor data. The event notification manager 320 may, for each of multiple types of sensor data, access these and/or one or more other stored false alarm criteria in connection with performing step 416.6.

If the currently-selected sensor data segment is determined in step 416.6 to have another explanation, a lower weight (e.g., 0) may be assigned to the sensor data segment in step 416.7. Otherwise, a higher weight (e.g., 1) may be assigned to that sensor data segment in step 416.8. In step 416.9, the event notification manager 320 may determine if there are other sensor data segments, associated with the currently-selected event data segment, to be evaluated for assignment of a lower or higher weight. If yes, step 416.4 may be repeated. If no, step 416.10 may be performed.

In step 416.10, the event notification manager 320 may determine if the sensor data segments associated with the currently-selected event data record satisfy a non-false threshold. For example, a non-false threshold may be satisfied if none of the sensor data segments was assigned the lower weight. Also or alternatively, the non-false threshold may be satisfied if an average of the assigned weights is within a designated percentage of the higher weight. Also or alternatively, the non-false threshold may be based on a sum of the assigned weights, and/or the higher and lower weights may have different values for different types of sensor data.

If the event notification manager 320 determines in step 416.10 that the non-false threshold has been satisfied, step 419 (FIG. 4A) may be performed. Otherwise, step 443 (FIG. 4C) may be performed.

As indicated above, step 419 may be performed based on a "yes" determination at step 416.2. Alternatively, one or more additional decision steps similar to steps 416.3 to 416.10 could be inserted between steps 416.2 and 419. A determination may be made, based on performing the one or more additional steps, to disregard a determination made at step 416.2 to proceed to step 419. For example, the event notification manger 320 may determine, based on performing the one or more additional steps, whether the data segment is contraindicated by one or more other data segments. If the data segment is determined to be contraindicated, a determination made at step 416.2 to proceed to step 419 may be disregarded and step 443 may instead be performed.

A determination that the data segment is contraindicated may be based on a comparison of the data segment with one or more other data segments. For example, the data segment may comprise information from an emergency dispatch report indicating an EMS event is occurring at a user premises (e.g., premises 102*a*). However, video footage from a home security system installed at the user premises may indicate that an EMS event is not occurring. The event notification manager 320 may determine that the data segment is contraindicated by video footage data. A determination that the data segment is contraindicated may be further based on satisfying one or more criteria (e.g., criteria such as the video footage is received from at least three or some other pre-determined number of different video cameras, the one or more other data segments are received from a pre-determined number of other sensors, the one or more data segments are associated with a pre-determined number of data types, and/or the one or more data segments are received from sensors determined to be reliable and/or trustworthy).

Figure 5:
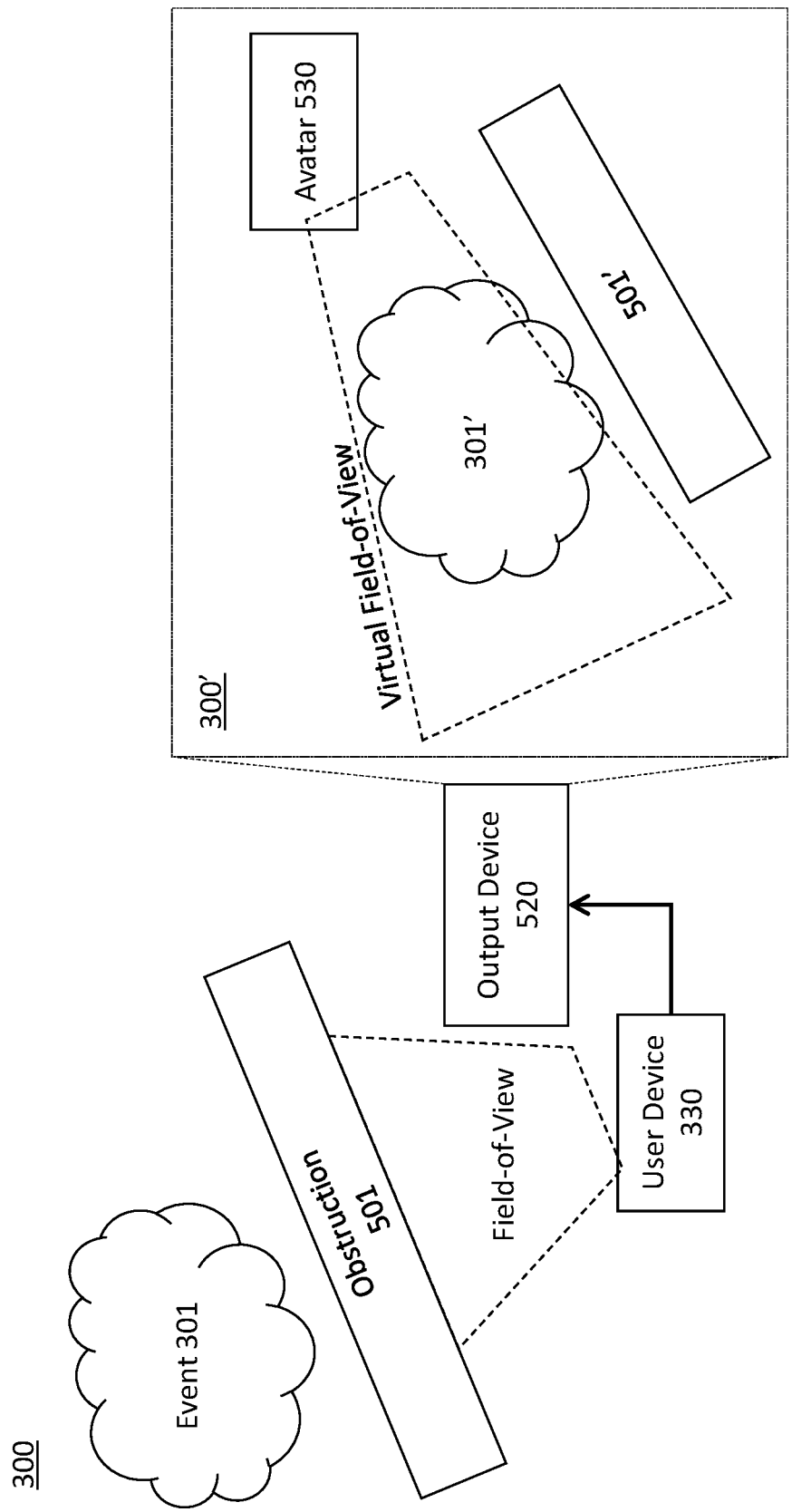
FIG. 5 shows an event and a virtual representation of the event.

There are numerous ways in which event notifications may be caused in accordance with the example method of FIGS. 4A-4E. For example, FIG. 5 shows the environment 300 comprising an event 301 and elements such as an obstruction 501 (e.g., a wall, a VR headset, vehicle(s), building(s), land-based features such as hills and/or mountains, or any combination of natural and/or artificial objects that may obstruct a field-of-view ("FoV")), a user device 330, and an output device 520 (e.g., a display device and/or an audio device) associated with the user device. The obstruction 501 may obstruct a FoV (e.g., one or more viewable portions of the environment 300) associated with a user of the user device. For example, the obstruction 501 may comprise a wall of an enclosed room that partially or fully obstructs a view of the event from the user location. Thus, the user may be unaware of an occurrence of the event until the user device outputs, via the output device 520, an event notification corresponding to the event.

The event notification may comprise a display of a virtual environment 300' corresponding to the environment 300. The virtual environment 300' may comprise a virtual obstruction 501' corresponding to the obstruction 501 and a virtual event 301' corresponding to the event 301. Furthermore, the virtual environment 300' may comprise an avatar 530 comprising a virtual FoV. Characteristics of the virtual FoV (e.g., viewing range and/or an angle of view) may be configurable via the notification preferences and/or the configuration settings associated with the user device. The avatar 530 may be user-navigable (e.g., in two- and/or three-dimensional virtual space) within the virtual environment 300'. For example, a location and/or orientation of the avatar 530 may be changed, via one or more input devices, to another location and/or orientation within the virtual environment 300'. The output device 520 may display some or all portions of the virtual event based on the location, orientation, and virtual FoV of the avatar 530. Alternatively, the avatar 530 may comprise a stationary perspective and stationary virtual FoV (e.g., if the output device 520 is a television set and/or while streaming local news reports via the output device 520).

Numerous event types may be represented, within the virtual environment 300', by the virtual event 301'. For example, the event may correspond to a severe weather event type. The user may navigate the virtual environment 300' and thus view virtual representations of storm related phenomena (e.g., tornado(s), high winds, nearby power outages, flooded areas, etc.), from various geographic perspectives (e.g., a ground-level view, a top-down sky-level view, near a user premises, neighboring geographic areas, etc.). The virtual event 301' may comprise visual and/or audio representations of sensor data segments such as video/image data (e.g., images of darkening skies, storm related structural damage of premises, lightning flashes), audio data (e.g., outdoor warning sirens, thunder, rainfall sounds), news report data (e.g., verbal reports comprising words indicating a storm event), and/or meteorological data (e.g., humidity data, thermal data, wind speed, wind direction, cloud cover, cloud height, and/or other types of meteorological data). Furthermore, the output device 520 may provide recommended user-actions based on configuration settings of the user device 330. For example, configuration settings may indicate the user device 330 is located at a premises with a basement. Thus, if a tornado is likely to occur or be occurring, the output device 520 may display and/or produce audio of a message recommending a relocation to the basement. Alternatively, the user device 330 may receive only text notifications or no notification of the severe weather event (e.g., if notification preferences indicate that severe storm event occurring outside of a pre-determined distance from the user device 330 should be ignored).

Also or alternatively, the event may correspond to an intruder event type. The virtual environment 300' may comprise a virtual representation of a premises (e.g., such as one of the premises 102) associated with the user. The user may navigate within the virtual premises and view virtual representations (e.g., images received via security cameras) and/or hear sounds (e.g., voices, footsteps, and other sounds detected by microphones) associated with one or more intruders. Furthermore, the output device 520 may output recommended user-actions based on configuration settings of the user device 330. For example, configuration settings may indicate that local public safety personnel (e.g., law enforcement and EMS) should be immediately notified (e.g., by the event notification manger 320) of the intruder event. For example, the event notification manager 320 may be configured to notify an emergency dispatcher of the intruder event. The notification may comprise information of an address of the premises, number of suspected intruders, whether any weapons (e.g., knives, guns, etc.) have been detected (e.g., via implementation of image matching techniques with pre-determined image data and video-camera data), and/or status(es) of one or more people located within or near the premises (e.g., devices configured to monitor vital signs such as pulse rate may further be further configured to provide monitored vital signs to the event notification manager 320).

Also or alternatively, the event may correspond to a fire event type associated with a premises such as premises 102. The virtual environment 300' may comprise visual representations of fire related phenomena (e.g., present and predicted spread of fire and/or smoke, temperature, etc.), from various perspectives within and outside of the premises (e.g., the avatar 530 may be navigated to rooms, hallways, grounds, and land-based and/or sky-based views represented within the virtual environment 300'). Visual and/or or audio representations of the fire related phenomena may be based on sensor data segments such as thermal data (e.g., temperature data points mapped to geographic locations), video and/or audio data (e.g., video cameras installed inside and outside of a premises with views of elevators, stairwells, and/or local traffic), news reports (e.g., mentioning words such as "fire," "forest fire," or any other word associated with a fire event type), meteorological data (e.g., indicating a predicted spread of a fire to the premises), or any other type of data that may indicate a fire event. Furthermore, the output device 520 may provide a notification that EMS personnel have been notified of the fire event. The output device 520 may provide recommended user-actions according to local public safety and/or EMS protocols. If a determination is made that the user should attempt to escape a premises, the virtual representation of the fire event may indicate whether a nearby elevator is functional (e.g., electrical data from an electrical network monitoring sensor may indicate an elevator power outage) or whether one or more nearby stairwells are accessible (e.g., video data from installed video cameras may indicate that some stairwells are congested with people, while others may be less congested).

Figure 6:
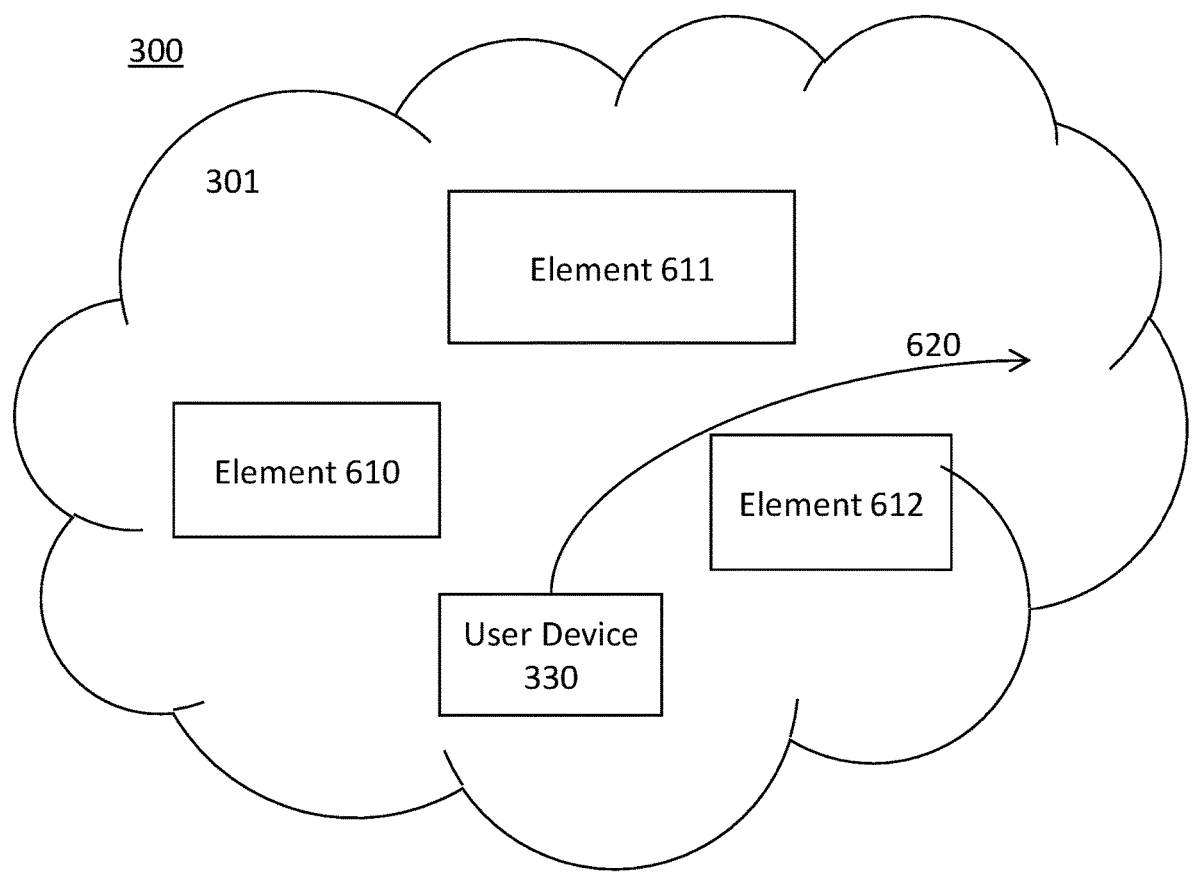
FIG. 6 shows a user device located near an event comprising hazardous elements.

An event notification may further comprise recommendations for navigating hazardous elements associated with an event. For example, FIG. 6 shows the environment 300 with a user device 330 and an event 301 comprising hazardous elements 610, 611, and 612. Each of the hazardous elements may correspond to one or more hazard types such as downed power lines, flooded areas, fire, hazardous fumes, dangerous weather areas, pockets of ionizing radiation, hostile intruders, vehicular wreckage debris, or any other type of hazardous condition or occurrence. Geographic locations associated with the hazardous elements may be determined based on sensor locations and/or sensor data segments. For example, image and/or video data received from two or more sensors with known locations may be used to identify and triangulate positions of the hazardous elements. An event notification of the event 301 may comprise outputting to the user device 330 a recommended navigation path 620 that has been determined (e.g., by the event notification manager 320, based on geographic locations of the hazardous elements and the user device 330) to minimize user-interactions with one or more of the hazardous elements 610-612.

The user device 330 may receive an event notification output of the event 301 showing hazard types and locations (e.g., relative to the user device location) associated with one or more of the hazardous elements 610-612. The navigation path 620 may correspond to one or more of a walking path, a driving route, a flight path, or a water navigation path. Proximity of the user device 330 to a hazardous element may be indicated via a display (e.g., virtual representation of hazardous elements), an audio output (e.g., warning sounds indicating nearby hazardous elements), and/or physical movements of the user device 330 (e.g., a mobile phone vibration). If the event 301 corresponds to an EMS event type, the navigation path 620 may indicate a path to a nearby injured person. For example, the navigation path 620 may indicate a location of a nearby automated-external-defibrillator (AED) and location(s) of injured person(s).

Figure 7:
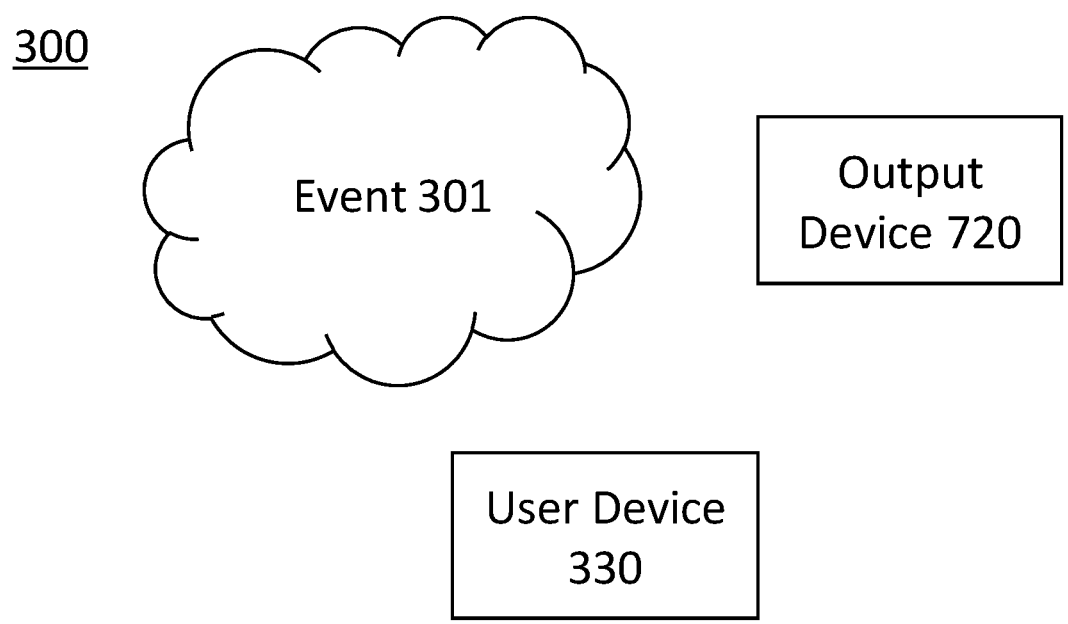
FIG. 7 shows an event located near a user device and an output device.

FIG. 7 shows the environment 300 comprising a user device 330, an output device 720, and an event 301. A user of the user device 330 may perceive visual stimuli (e.g., flashing lights) and/or audial stimuli (e.g., vocalizations that may indicate distress, explosion sounds, outdoor warning sirens, EMS sirens) indicating an occurrence of the event 301. For example, the user may perceive sounds consistent with ambulance or other EMS sirens and with injured persons. However, the user device 330 may receive an event notification of the event 301 indicating that the visual and/or audial stimuli likely originate from a source such as the nearby output device 720. For example, a determination may be made that the output device 720 is outputting video and/or sounds consistent with the visual and/or audial stimuli (e.g., visuals and sounds may originate from a nearby television set playing an EMS related movie, sounds may originate from a vehicle speaker system, etc.). Thus, an event notification may comprise a message indicating that the event 301 may be ignored.

Also or alternatively, the output device 720 may comprise a speaker device, a headset, an earbud, or any other device capable of producing audio. The user device 330 may receive an event notification indicating the event 301 comprises one or more of a plurality of pre-determined sounds (e.g., outdoor warning sirens, a voice associated with the user's parents, etc.). The user device 330 may output, via the output device 720, audio associated with the event 301. For example, the event 301 may comprise a parent speaking to a child wearing the output device 720 (e.g., wearing headphones while listening to music). The output device 720 may be caused to cease output (e.g., stop playing music) based on detecting the parental voice and instead output the parent's voice. Also or alternatively, the event 301 may comprise a severe weather event. The output device 720 may be caused to cease output based on a determination that an outdoor warning siren is active, and instead output audio of the outdoor warning siren.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
receiving, by a computing device from a plurality of sensors in proximity of one or more user devices, sensor data of a plurality of different sensor data types and indicating a condition in an environment associated with the one or more user devices;
based on a comparison of the indicated condition to data defining a plurality of hazardous event types, determining an occurrence of a hazardous event; and
causing, based on the determining, the one or more user devices to output, by at least partially interrupting content being output by the one or more user devices, an event notification for the hazardous event, wherein the event notification indicates access information to escape from the hazardous event, the access information comprising one or more of:
location of an elevator and operational condition of the elevator; or location of a stairwell and congestion level of the stairwell.

2. The method of claim 1, wherein the condition in the environment comprises one or more of:
downed power lines, flooded areas, fire, hazardous fumes, hazardous weather areas, pockets of ionizing radiation, hostile intruders, or vehicular wreckage debris.

3. The method of claim 1, wherein the plurality of different sensor data types comprise two or more of: audio data, image data, video data, thermal data, temperature data, atmospheric pressure data, humidity data, wind data, smoke data, gas composition data, vibration data, motion data, security sensor data, water data, entry sensor data, radiation data, or chemical data.

4. The method of claim 1, wherein the hazardous event comprises one or more of: a weather condition, a fire, a vehicle accident, an emergency-medical-service (EMS) activity, a mass casualty, criminal activity, civil unrest, a mass evacuation, a hazardous material (HAZMAT) incident, an industrial accident, or a terrorist incident.

5. The method of claim 1, wherein the causing the one or more user devices to output the event notification is further based on data associated with each of the one or more user devices.

6. The method of claim 1, further comprising:
determining a characteristic of a user associated with a user device of the one or more user devices; and
based on the determined characteristic, not causing the user device to output the event notification.

7. The method of claim 1, wherein the causing the output of the event notification is further based on a determination that the hazardous event is not a false event.

8. The method of claim 1, wherein the one or more user devices comprise at least one of:
a headphone device;
a virtual reality device;
an augmented reality device;
a mixed reality device;
a mobile phone; or
a display device.

9. The method of claim 1, wherein the plurality of sensors comprise one or more of: a camera, a microphone, a vibration sensor, a temperature sensor, a heat sensor, a wind sensor, a water sensor, radar, a proximity sensor, a pressure sensor, an entry sensor, a photodetector, an accelerometer, a gas sensor, a smoke detector, an inclinometer, a chemical sensor, or a motion detector.

10. The method of claim 1, further comprising:
receiving one or more additional data inputs indicating the hazardous event, wherein the one or more additional data inputs comprise one or more of: a news report, an emergency bulletin from a governmental authority, or an Emergency Alert System (EAS) message,
wherein the determining is further based on the one or more additional data inputs.

11. The method of claim 1, wherein the event notification indicates one or more of:
locations of one or more hazards associated with the hazardous event,
locations of the one or more user devices and of the one or more hazards, or
a path to avoid the one or more hazards.

12. A method comprising:
receiving, by a computing device, one or more data segments comprising an indication of a condition in proximity to a first user device and a second user device;
determining, based on the one or more data segments and on data associated with one or more event types, that the one or more data segments indicate an occurrence of an event;
causing, based on an event type associated with the event and on the first user device being associated with a parent user, the first user device to output a first type of event notification for the event; and
causing, based on detecting a voice of the parent user in a second type of event notification and on the second user device being associated with a child user, the second user device to output, by interrupting content being output by the second user device, the second type of event notification for the event.

13. The method of claim 12, wherein the causing the first user device to output the first type of event notification of the event is further based on a moving direction of hazardous elements associated with the event and a distance between the hazardous elements and the first user device.

14. The method of claim 12, wherein the first user device and the second user device each comprise at least one of:
a headphone device;
a virtual reality device;
an augmented reality device;
a mixed reality device;
a mobile phone; or
a display device.

15. The method of claim 12, wherein the one or more data segments correspond to one or more of audio data, images, video, thermal data, temperature data, atmospheric pressure data, humidity data, wind speed, wind direction, gas composition data, ground vibration data, seismic data, meteorological data, news report data, weather report data, non-ionizing radiation data, or ionizing radiation data.

16. The method of claim 12, wherein the first type of event notification comprises an image or a video associated with the event, and wherein the second type of event notification lacks at least one of:
an image, associated with the event, comprised by the first type of event notification, or
a video, associated with the event, comprised by the first type of event notification.

17. The method of claim 12, wherein the event comprises one or more of: a weather condition, a fire, a vehicle accident, an emergency-medical-service (EMS) activity, a mass casualty, criminal activity, civil unrest, a mass evacuation, a hazardous material (HAZMAT) incident, an industrial accident, or a terrorist incident.

18. The method of claim 12, wherein the condition comprises one or more of:
downed power lines, flooded areas, fire, hazardous fumes, hazardous weather areas, pockets of ionizing radiation, hostile intruders, or vehicular wreckage debris.

19. The method of claim 12, wherein the causing the first user device to output the first type of event notification is further based on a determination that the event is not a false event.

20. The method of claim 12, wherein the causing the second user device to output the second type of event notification is further based on a determination that the event is not a false event.

21. The method of claim 12, wherein the receiving comprises receiving the one or more data segments from a plurality of sensors, the plurality of sensors comprising one or more of: a camera, a microphone, a vibration sensor, a temperature sensor, a heat sensor, a wind sensor, a water sensor, radar, a proximity sensor, a pressure sensor, an entry sensor, a photodetector, an accelerometer, a gas sensor, a smoke detector, an inclinometer, a chemical sensor, or a motion detector.

22. The method of claim 1, further comprising:
determining the operational condition of the elevator; or
determining the congestion level of the stairwell.

23. The method of claim 1, wherein the data defining a plurality of hazardous event types comprises a plurality of audio/visual criteria corresponding to the plurality of hazardous event types.

* * * * *